United States Patent [19]
Ai

[11] Patent Number: 5,452,088
[45] Date of Patent: Sep. 19, 1995

[54] MULTIMODE-LASER INTERFEROMETRIC APPARATUS FOR ELIMINATING BACKGROUND INTERFERENCE FRINGES FROM THIN-PLATE MEASUREMENTS

[75] Inventor: Chiayu Ai, Tucson, Ariz.

[73] Assignee: Wyko Corporation, Tucson, Ariz.

[21] Appl. No.: 210,671

[22] Filed: Mar. 18, 1994

[51] Int. Cl.$^6$ .............................................. G01B 9/02
[52] U.S. Cl. ..................................................... 356/359
[58] Field of Search ............... 356/345, 357, 358, 359, 356/360

[56] References Cited

U.S. PATENT DOCUMENTS

| | | | |
|---|---|---|---|
| 4,872,755 | 10/1989 | Kuchel | 356/360 |
| 4,969,736 | 11/1990 | Slotwinski | 356/358 |
| 5,323,229 | 6/1994 | May et al. | 356/357 |
| 5,341,205 | 8/1994 | McLandrich et al. | 356/358 |

OTHER PUBLICATIONS

P. de Groot et al., Laser diodes map surface flatness . . . , Feb. 1994, published in Laser Focus World.
Katsuyuki OAkada et al., Separate measurements of surface shape . . . , Aug. 1990, vol. 29, No. 22, Applied Optics.
Y. Ning et al., Char. of laser diodes . . . , Sep. 1989, vol. 28, No. 17, Applied Optics.
D. Huang et al., Optical Coherence Tomography, Nov. 1991, vol. 254, Science Reports.

*Primary Examiner*—Samuel A. Turner
*Attorney, Agent, or Firm*—Antonio R. Durando

[57] ABSTRACT

Fizeau interferometer that utilizes a multimode laser as a light source for testing transparent thin-plate samples. As a result of multimode linear laser operation, interference fringes are obtained only when the optical path difference between the reference surface and test surface is equal to twice a multiple of the laser's effective cavity length. By judicially selecting the multimode spectrum of operation and the effective cavity length of the laser, the interferometer may be calibrated to produce interference fringes at a workable separation between the reference and test surfaces without ghost interference fringes from the far surface of the thin-plate sample. Another embodiment of the invention alternatively utilizes two linear lasers with different effective cavity lengths to eliminate ghost interference fringes when the optical thickness of the thin-plate is equal to a multiple of one laser's effective cavity length.

22 Claims, 3 Drawing Sheets

MULTIMODE-LASER INTERFEROMETRIC APPARATUS FOR ELIMINATING BACKGROUND INTERFERENCE FRINGES FROM THIN-PLATE MEASUREMENTS

BACKGROUND OF THE INVENTION

1. Field of the Invention

This invention pertains to the general field of interferometry and apparatus for testing surfaces. In particular, it provides a novel approach for testing transparent thin plates and domes by utilizing multimode lasers as the light source for producing interference fringes.

2. Description of the Prior Art

Fizeau interferometers are used in optical laboratories to test the surface geometry of test samples, such as computer-disk and optical-mirror flatness, in comparison to reference surfaces. As illustrated in schematic representation in FIG. 1, a light source 10 (normally a laser operating in the single mode) produces a beam of light 12 that is passed through a microscope objective 14 and a spatial filter 16, such as a pinhole. The light 12 is then collimated by a very-well corrected collimating objective 18 and directed through a reference surface 20 (normally flat) toward a test surface 22 positioned collinearly (with respect to the light beam) and substantially in parallel to the reference surface at some distance within the coherence length of the light source 10. As those skilled in the art readily understand, the light reflected by the test surface 22 interferes with the light reflected at the reference surface 20 and, according to the principle of superposition, bright interference fringes are produced corresponding to all points on the reference surface where the optical path difference (OPD) of the light is equal to a multiple of its wavelength. A beam splitter 24 is placed between the spatial filter 16 and the collimating objective 18 in order to reflect the fringes to the side, so that they may be observed on a screen or directed to a camera 26 through appropriate lenses 28 for display, and/or to other instrumentation for recording and data processing. The interference fringes so produced are typically used to provide a profile of the tested surface.

Most Fizeau interferometers use lasers operating in the single mode because of their very long coherence length (in the order of tens of meters) which permits the placement of the test surface at a practical distance from the reference surface. Because of the opposing positions of the reference and test surfaces, it is important to retain some separation between the two in order to avoid damage. In addition, because of the characteristics of single-mode light, the separation between the reference and test surfaces is not critical to obtain interference fringes so long as within the coherence length, thus facilitating the process of adjusting the position of a sample to produce fringes.

When utilized to test transparent thin-plate samples having parallel surfaces, single-mode laser Fizeau interferometers generate spurious reflections from the opposite surface of the test sample that produce ghost fringes materially affecting the measurements. Referring to FIG. 2, for example, a single-mode light beam $\lambda1$ is reflected from the reference surface R and the test surface T of a test sample 30 to produce the desired interference, herein referred to as $IF_{RT}$. At the same time, though, the light is also reflected from the back surface S of the sample, thus producing an interference $IF_{TS}$ between the light reflected from surfaces T and S, and an interference $IF_{RS}$ from surfaces R and S. This results from the fact that single-mode laser light produces interference fringes at all points within its coherence length. Therefore, the thickness of the transparent thin-plate test sample 30 is immaterial and the resulting fringes will always represent the cumulative interference of the three sets $IF_{RT}$, $IF_{TS}$ and $IF_{RS}$. Thus, when testing the front surface T of a parallel-surface glass plate, one always sees a fixed pattern caused by interference between the front and back surfaces.

In order to avoid the effects of the reflections from the back surface S, people have coated it with paints or oils (antireflective coatings), so as to absorb all incident light and eliminate all reflection from it. This solution is obviously cumbersome and time consuming; therefore, while possibly acceptable for laboratory testing, it is not suitable for rapid testing of commercial products, such as glass computer discs.

As described in a recent article, some investigators have proposed a mathematical solution based on processing interference data generated with two single-mode wavelengths. See de Groot et al., "Laser Diodes Map Surface Flatness of Complex Parts," Laser Focus World, 95–98 (February 1994). The cumulative interference $IF_{RTS}$ produced by the three surfaces R, T and S is measured with a first wavelength $\lambda1$ and with a second wavelength $\lambda2$, as shown schematically in FIG. 3. Then the sample 30 is flipped over with the back surface S now facing the reference surface R, as seen in FIG. 4, and the cumulative interference $IF_{RST}$ is again measured with the two wavelengths $\lambda1$ and $\lambda2$. Thus, four sets of interference data are generated from which the desired interference $IF_{RT}$ may be extracted by mathematical manipulation. A similar procedure is described by Okada, K. et al., in "Separate Measurements of Surface Shapes and Refractive Index Inhomogeneity of an Optical Element Using Tunable-Source Phase Shifting Interferometry," Applied Optics, 3280–3284 (August 1990). These methods require double handling of the sample and additional processing time, which also materially affect the speed of testing for commercial applications. Another solution is the use of a light source of short coherence length, such as a white light source L, so that the back surface S may be placed beyond the point where it generates interference with the reference surface. To cause interference, the optical path difference between the test and the reference paths must be within the coherence length $l_{coh}$ of the system. Therefore, in order to satisfy this requirement when using white light, the reference and the test surfaces must be very close to one another (separated by distances in the order of 10 μm). As illustrated in FIG. 5, by positioning the sample 30 so that the front test surface T is within half the coherence length $l_{coh}$ and the back surface S is outside of it, the latter surface will not cause interference with the reference surface and, by mathematically filtering out the fixed interference between the surfaces T and S (if necessary), accurate measurements can be made of the test surface T.

For good results the separation between the reference and test surfaces must be less than one half of the coherence length. For example, if a 2 nm bandwidth visible light source is used, the coherence length is about 0.20 mm. Thus, the separation between the surfaces R and T must be less than 0.10 mm, which means that the two surfaces are practically in physical contact. At the same time, for a typical glass plate having a 1-mm optical thickness, the separation between the reference surface R and the back surface S would be between 1.00 mm and 1.10 mm, much greater than one half the coherence length of the instrument. Thus, no interference between the reference and back surfaces is obtained.

If a narrower bandwidth is chosen, the coherence length and hence the separation can be greater, but the reflection from the back surface S of the glass plate may interfere with the reference and the test beams. Therefore, short coherence lengths are required for this type of application and the sample must necessarily be placed in very close proximity to (or contact with) the reference surface. This requires careful handling of the sample to avoid scratching of the surfaces, which is cumbersome and time consuming. Therefore, this solution is also not suitable for rapid testing in a production environment.

Accordingly, it would be very desirable to have a simpler and more practical method and apparatus for testing the surfaces of thin transparent plates and domes without interference from the opposite surface of the sample. This invention provides such a method and apparatus utilizing multimode lasers as the interferometer's light source. While multimode lasers have been used in some Michelson interferometry applications for the narrow coherence length they can produce, this property has not heretofore been recognized as the viable and practical solution it can be for the problems outlined above.

BRIEF SUMMARY OF THE INVENTION

It is therefore an objective of this invention to provide a Fizeau interferometer capable of testing one surface of thin-plate or dome transparent material without interference from the opposite surface.

Another objective of the invention is an interferometer that utilizes a light source with a practical coherence length, so that the test surface does not need to be placed in very close proximity of the reference surface.

Another goal of the invention is a method and apparatus that do not require coating of the sample with antireflective substances.

A further objective of the invention is that the testing procedure minimize manipulation of the test sample.

Another goal of the invention is its general application to instrumentation that utilize the effect of interference between reflections from two parallel surfaces traversed collinearly by a beam of light.

Finally, another goal is the implementation of the above mentioned objectives in a commercially viable system that maximizes the utilization of existing technology.

In accordance with these and other objectives, the preferred embodiment of the method and apparatus of this invention consists of a Fizeau interferometer that utilizes a multimode laser as a light source for testing transparent thin-plate samples. As a result of the multimode laser operation, interference fringes are obtained only when the optical separation between the reference surface and test surface is equal to a multiple of the laser's effective cavity length. By judiciously selecting the multimode spectrum of operation and the effective cavity length of the laser, the interferometer may be calibrated to produce interference fringes at a workable optical separation between the reference and test surfaces without ghost interference fringes from the opposite surface of the thin-plate sample. Another embodiment of the invention alternatively utilizes two lasers with different effective cavity lengths to eliminate ghost interference fringes when the optical thickness of the thin-plate is equal to a multiple of one laser's effective cavity length.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

DETAILED DESCRIPTION OF THE INVENTION

Figure 1:
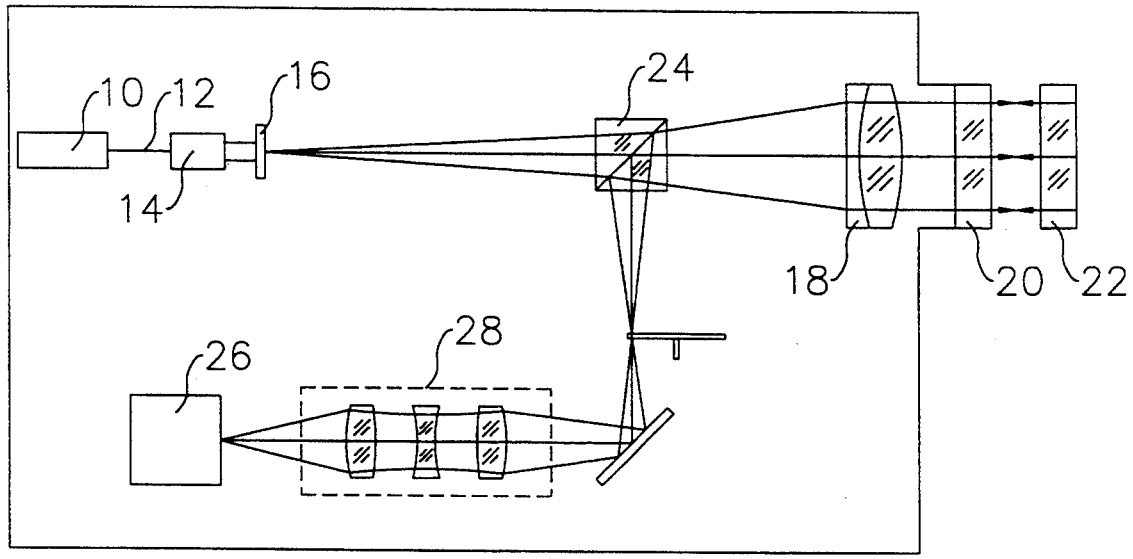
FIG. 1 is a schematic representation of a Fizeau interferometer.
Figure 2:
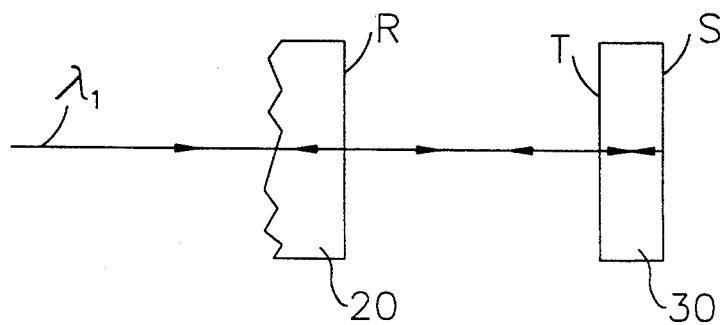
FIG. 2 is an illustration of the reflected light paths between a reference surface and the surfaces of a transparent thin-plate test sample in a conventional Fizeau interferometer operating with a single-mode laser.
Figure 3:
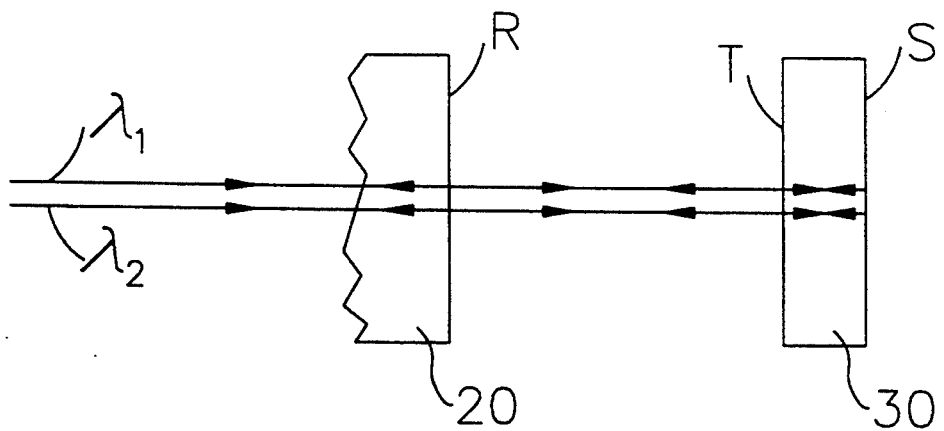
FIG. 3 is an illustration of the reflected light paths as shown in FIG. 2 when two distinct wavelengths are utilized.
Figure 4:
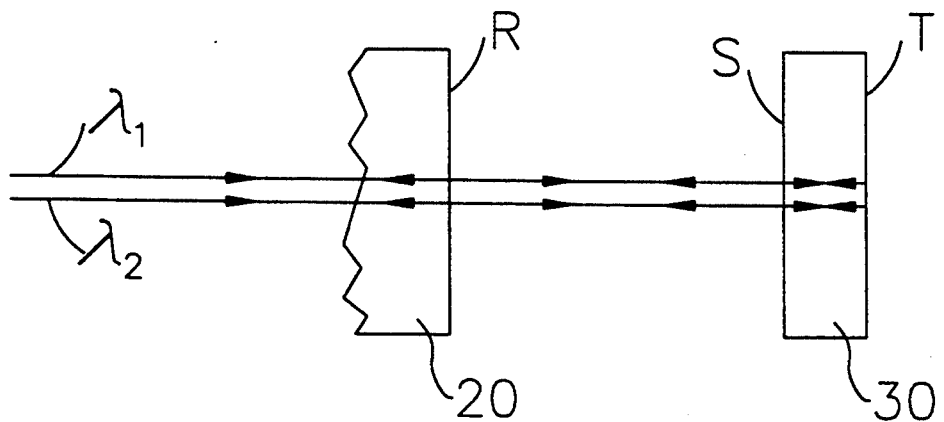
FIG. 4 is an illustration of the mode of operation of FIG. 3 wherein the test sample has been flipped, such that the original back surface becomes the test surface.
Figure 5:
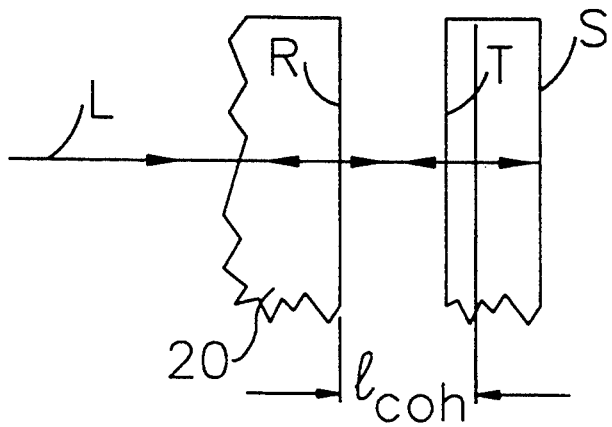
FIG. 5 is an illustration of the small separation between a reference surface and a sample's test surface when a white light source is used in a conventional Fizeau interferometer.

The method and apparatus of this invention are based on principles of physical optics that have been understood for a long time but have never been applied to solve the interferometry problems addressed in this disclosure. In search of more practical solutions for these problems than so far achieved in the field of interferometry, it became apparent that the application of these principles makes it possible to modify conventional Fizeau interferometers to eliminate all such problems at relatively low cost, thus providing an excellent opportunity for materially improving the versatility of commercial instruments.

Simply stated, this invention is based on the realization that multi-longitudinal-mode (hereinafter referred to as multimode) lasers produce a coherence function with periodic spikes (i.e., spikes separated by constant distance intervals) that can be exploited to eliminate interference from background surfaces. As predicted by the Fourier theorem, a two-mode laser has a coherence function with a sinusoidal envelop and a multimode laser has a coherence function with several spikes, each spike having a width determined by the number of modes. For a linear laser, the spike separation in the coherence function (SSICF, the constant distance between spikes) is equal to twice the effective cavity length of the laser; for a ring laser, the SSICF is equal to the effective cavity length of the laser. Therefore, the spike separation in the coherence function is determined by the effective cavity length of the laser, while the width of each spike decreases as the number of modes increases.

It is known that interference fringes between reflections from two surfaces exposed to a multimode laser light, where the number of modes is sufficiently large to produce a narrow, well-defined spike (normally at least three modes are necessary), are only obtained when the optical path difference between the two surfaces is nearly equal to a multiple of the spike separation in the coherence function of the laser. Under these conditions, when a linear cavity laser is used in a Fizeau interferometer, the optical distance between the surfaces coincides with a multiple of the effective cavity length of the laser. Therefore, by choosing a number of modes appropriate for obtaining a narrow width of the coherence function spikes, so that each spike is sufficiently distinct, it is possible to generate interference fringes only from surfaces that have an OPD from the reference surface equal to nearly a multiple of the spike separation in the coherence function of the laser. Other nearly-parallel surfaces do not produce interference fringes with the reference surface unless they also meet this criterion. Therefore, when applied to a Fizeau interferometer, this property makes it possible to test transparent thin-plate or dome material without interference by reflections from all background surfaces that do not have the critical optical path difference from the reference surface.

Figure 6:
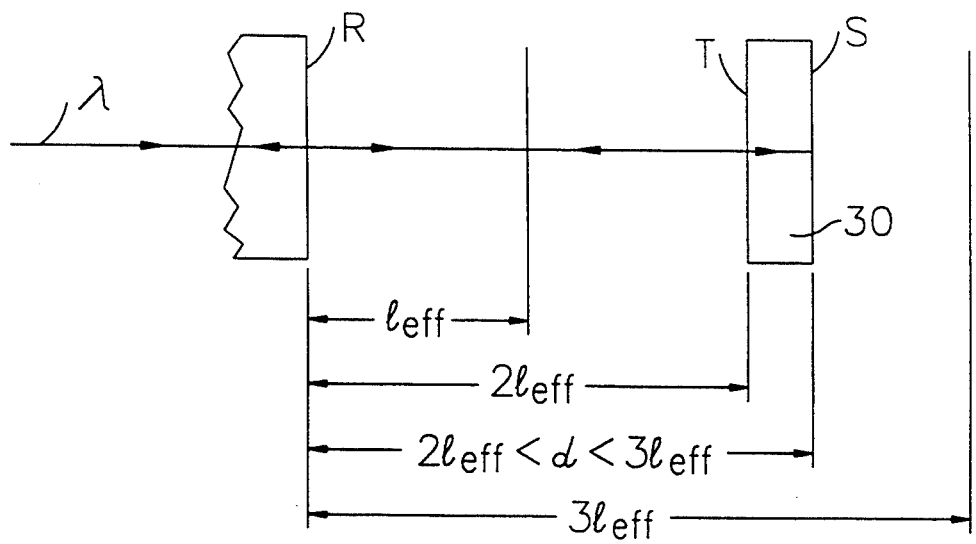
FIG. 6 is an illustration of the reflected light paths between a reference surface and the test surface of a transparent thin-plate test sample in a conventional Fizeau interferometer operating with a multimode light source.

For example, referring to the system shown schematically in FIG. 6, a glass plate 30 with an optical thickness of 1 mm is shown positioned for testing in a multimode-laser Fizeau interferometer according to the present invention. A linear laser with an effective cavity length $l_{eff}$ of 3.0 mm is used, which therefore produces interference fringes only as a result of reflections from surfaces separated from the reference surface R by an optical distance equal to a multiple of 3 mm (i.e., 6 mm, 9 mm, etc.). Clearly, the test surface T, which is shown as being separated from the reference surface R by twice the laser's effective cavity length $l_{eff}$ (i.e., 6 mm), will produce interference fringes. On the other hand, the back surface S of the test sample 30, being separated from the reference surface R by an optical distance d of 7.0 mm, greater than twice $l_{eff}$ (6.0 mm) and smaller than three times $l_{eff}$ (9 mm), will not produce interference fringes. The net result is that spurious interference fringes from the back surface S are eliminated. Because of the characteristics of the coherence function of a multimode light, the width of each spike can be made very short (by increasing the number of modes), e.g. 0.10 mm, thus ensuring that the reflection from the back surface S of the glass plate is eliminated even when that surface is relatively close to a multiple of the laser's effective cavity length $l_{eff}$. In the case of the example of FIG. 6, a width of the spike of 0.10 mm would substantially eliminate spurious interference fringes for samples with optical thicknesses varying between approximately 0.1 and 2.9 mm.

As one skilled in the art would readily understand, the coherence length of white light and of single-mode laser light determines the effective optical distance within which a system is operable. That is, the coherence length of the light beam corresponds to the range of operation of the interferometric apparatus beyond which useful interference fringes cannot be obtained (i.e., reflections are no longer coherent). On the other hand, when multi-frequency light is used (such as from a multimode laser), the coherence length is normally understood to refer to the maximum width of each spike in the coherence function of the light, which corresponds to the useful realm of operation in the vicinity of each spike but not to the overall range of operation of the instrument. Therefore, for the purposes of this disclosure, the maximum OPD between a reference and a test surface, within which coherent reflections capable of producing useful interference fringes are obtained, is herein defined as the coherence range of the light.

It is noted that these properties of multimode laser light can be applied to any situation where it is desired to produce interference fringes between a reference surface and a test surface without obtaining ghost fringes from other background surfaces placed substantially parallel to the test surface. Similarly, this invention is not limited to laser light. Any source capable of producing a light with a coherence function characterized by periodic spikes, with a spike width and a coherence range (as defined) of acceptable sizes for the intended application, would be suitable to practice the invention. In fact, the concept of the invention is applicable to any light characterized by a coherence function with periodic peaks (maxima) and corresponding periodic valleys (minima), such as the sinusoidal coherence function of sodium-arc-lamp light. As made apparent by this disclosure, interference fringes may be maximized by positioning the test surface such as to have an optical path difference from the reference surface equal to nearly-exactly a multiple of the distance between peaks (or valleys) in the coherence function. At the same time, interference fringes may be minimized (or eliminated, depending on the exact nature of the function) by positioning the opposite surface so as to have an OPD from the reference surface equal to nearly-exactly a multiple plus one half of the distance between peaks (or valleys).

Figure 7:
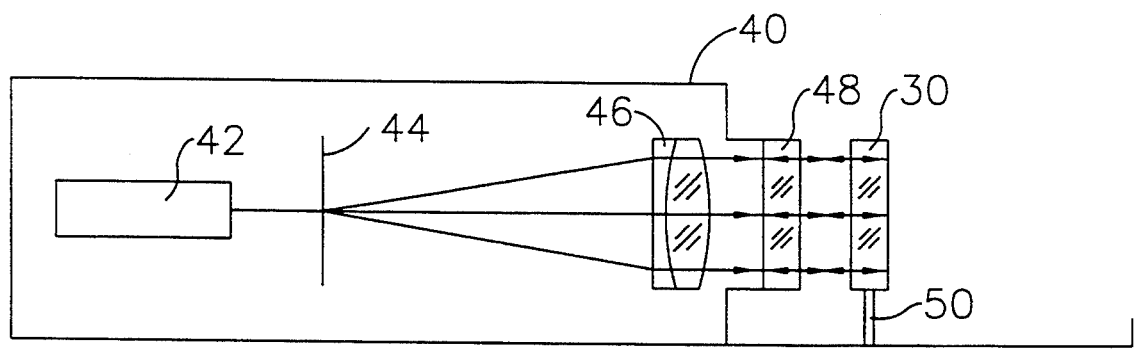
FIG. 7 is a schematic illustration of the basic components of the apparatus of the present invention.

Thus, the critical Fizeau-interferometer components of the apparatus 40 of the invention are shown in schematic representation in FIG. 7. The device simply consists of a light source 42 capable of generating a light with a coherence function characterized by spikes having a relatively narrow width and by an acceptable coherence range for the intended range of operation of the instrument. The light is passed through a spatial filter 44 (if necessary) and a collimator 46 for projection toward a reference surface 48 and a test sample 30 disposed substantially parallel to the reference surface on a rigid support 50 placed at a distance within the coherence range of the light source 42. As those skilled in the art understand, the relative size of the spike width of the light in comparison to the spike separation determines the degree of elimination of ghost fringes from other nearly-parallel background surfaces exposed to the light. For good practical results, the maximum width of the spikes in the coherence function should be less than 50 percent of the separation between spikes, preferably within 10 percent. In the case of laser light, the width of each spike is determined by the number of modes of the light and the periodic separation between spikes is determined by the effective laser cavity length. For example, a 15-mode laser with an effective cavity length of 5 mm will produce a coherence function with spikes about 0.50 mm wide. For the purposes of this invention, laser operation at 10 or more modes is recommended, 10 to 15 modes being preferred, and yet more modes (up to 30) being even more preferred if practically feasible.

In operation, the position of the test sample 30 is adjusted to cause the OPD between the test surface T from the reference surface R to coincide with a multiple of the distance between the spikes in the coherence function of the light produced by the source 42. As explained above, in the case of a multimode linear laser such distance corresponds to twice the laser's effective cavity length; in the case of a multimode ring laser, it corresponds to the laser's effective cavity length. Thus, the test surface produces reflections that generate interference fringes when superimposed to the reflections produced by the reference surface. These fringes are then observed, recorded or processed as desired by utilizing methods and apparatus that are well known in the art (not shown in the figures).

Figure 8:
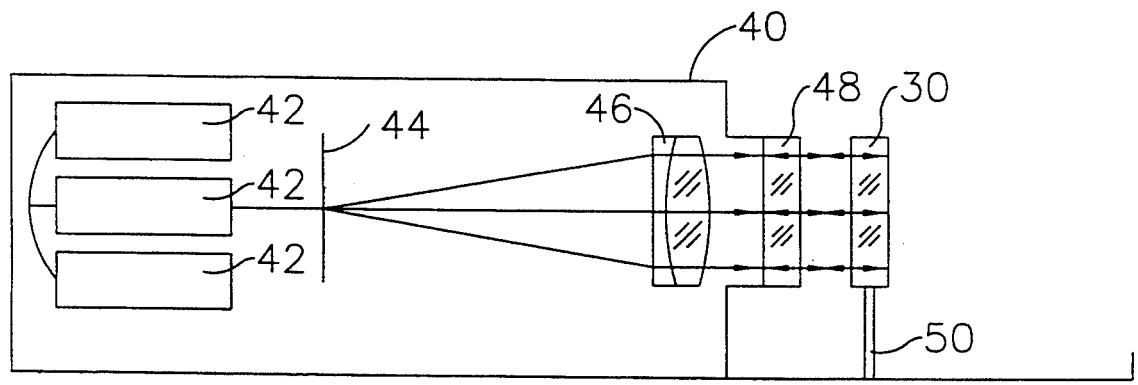
FIG. 8 is a schematic illustration of the basic components of an alternative embodiment of the apparatus of the present invention comprising two or more light sources.

If the material being tested, such as glass plate, has an optical thickness that is very close to one half of a multiple of the light's coherence function's spike separation (or, in the case of linear lasers, a multiple of the effective cavity length), then the reflection from the back surface of the glass plate also interferes with the reference and test beams. To overcome this problem, two lasers with different effective cavity lengths may be installed for alternative use in the apparatus, as illustrated schematically in FIG. 8. Such combination of two (or more) lasers makes it possible to test a plate of almost any thickness of interest. Note that more than two lasers would be needed only in the rare event of a plate having an optical thickness corresponding to a multiple of the effective cavity lengths of two of the lasers. For example, an instrument having two lasers with effective cavity lengths of 3.0 mm and 3.5 mm could not be used to accurately test a sample 21.0 mm thick. Thus, a third laser with a different effective cavity length that is not an integer divisor of 21.0 (e.g., 3.3 mm) could be used.

It is clear from the breadth of application of the concept covered by this invention that those skilled in the art could in obvious manner include refinements that have been ignored in this disclosure. Depending on the particular application, other instrumentation and apparatus for measuring and processing the interference-fringe data produced by the method disclosed herein would be required. Any such improvements and modifications, though, would still require the application of the concept of this invention for a successful elimination of interference from background surfaces. Similarly, though this disclosure is illustrated by examples where the test surface T is shown in front and the background surface S in the far side of the light source, the position of the two could be reversed and the method and apparatus of the invention applied with equivalent results.

Therefore, it is understood that many equivalent systems are possible within the scope of the present invention and that those skilled in the art could easily design a special system for a specific application. Thus, various changes in the details and steps that have been described may be made by those skilled in the art within the principles and scope of the invention herein illustrated and defined in the appended claims. While the present invention has been shown and described in what are believed to be the most practical and preferred embodiments, it is recognized that departures can be made therefrom within the scope of the invention, which is therefore not to be limited to the details disclosed herein, but is to be accorded the full scope of the claims so as to embrace any and all equivalent apparatus and methods.

I claim:

1. Interferometric apparatus for producing interference fringes between two surfaces free of interference from background surfaces, comprising:
   (a) a light source adapted to produce a light having a coherence function characterized by periodic spikes of predetermined separation and of approximately equal height over successive periods, said light having a coherence range greater than an intended range of operation of the apparatus;
   (b) a reference surface disposed across said light; and
   (c) means for accurately placing a test surface collinearly with said reference surface and so as to have an optical path difference from the reference surface equal to a multiple of said predetermined separation.

2. The apparatus described in claim 1, wherein said interferometric apparatus is a Fizeau interferometer and said light source consists of a multimode laser having a predetermined effective cavity length.

3. The apparatus described in claim 2, wherein said laser is adapted to produce at least a three-mode light.

4. The apparatus described in claim 2, wherein said laser is adapted to produce a light characterized by at least 10 modes.

5. The apparatus described in claim 1, wherein said interferometric apparatus is a Fizeau interferometer and said light source comprises more than one multimode laser for alternative use, each of said lasers having a different effective cavity length.

6. The apparatus described in claim 5, wherein each of said lasers is adapted to produce at least a three-mode light.

7. The apparatus described in claim 5, wherein each of said lasers is adapted to produce a light characterized by at least 10 modes.

8. The apparatus described in claim 1, wherein said interferometric apparatus is a Fizeau interferometer and said light source comprises two lasers, each of said two lasers having a different effective cavity length.

9. The apparatus described in claim 8, wherein each of said two lasers is adapted to produce at least a three-mode light.

10. The apparatus described in claim 8, wherein each of said two lasers is adapted to produce a light characterized by at least 10 modes.

11. The apparatus described in claim 1, wherein said light source consists of a sodium-arc lamp.

12. A method of producing interference fringes between a reference surface and a test surface of a transparent test sample having a substantially parallel back surface for interferometric measurements free of interference from said back surface and other background surfaces, comprising the following steps:
   (a) generating a light having a coherence function characterized by periodic spikes of predetermined separation and of approximately equal height over successive periods, said light having a coherence range greater than an intended range of operation for such interferometric measurements;
   (b) passing said light through the reference surface; and
   (c) accurately placing the test surface collinearly with said reference surface and so as to have an optical path difference from the reference surface equal to a multiple of said predetermined separation.

13. The method described in claim 12, wherein said light is generated by a multimode laser having a predetermined effective cavity length.

14. The method described in claim 13, wherein said laser is operated so as to produce at least a three-mode light.

15. The method described in claim 13, wherein said laser is operated so as to produce a light characterized by at least 10 modes.

16. The method described in claim 12, wherein said light is generated alternatively by more than one multimode laser, each of said lasers having a different effective cavity length.

17. The method described in claim 16, wherein each of said lasers is operated so as to produce at least a three-mode light.

18. The method described in claim 16, wherein each of said lasers is operated so as to produce a light characterized by at least 10 modes.

19. The method described in claim 12, wherein said light is generated alternatively by two lasers, each of said two lasers having a different effective cavity length.

20. The method described in claim 19, wherein each of said two lasers is operated so as to produce at least a three-mode light.

21. The method described in claim 19, wherein each of said two lasers is operated so as to produce a light characterized by at least 10 modes.

22. The method described in claim 12, wherein said light is generated by a sodium-arc lamp.

* * * * *